3,464,020
MICROWAVE SEMI-CONDUCTOR DEVICE

Jiro Koyama, Masao Sumi, and Seiji Ohara, Tokyo-to, Japan, assignors to Nippon Telegraph and Telephone Public Corporation, Tokyo-to, Japan, a public corporation of Japan Filed Dec. 13, 1966, Ser. No. 601,416
Claims priority, application Japan, Dec. 20, 1965, 40/78,068
Int. Cl. H03f *3/04*; H01s *1/00*
U.S. Cl. 330—5 8 Claims

ABSTRACT OF THE DISCLOSURE

A semiconductor device for amplifying microwave inputs comprising an n-type GaAs or InP semiconductor having a length considerably longer than the wave length of an input microwave and capable of realizing a drift velocity of electrons in conduction bands which decreases as an applied DC electric field is increased to exceed a critical value. The input and output means are connected to end portions of the semiconductor. The semiconductor is excited by a DC source having ohmic contacts for applying the DC field in excess of the critical value along its longitudinal length effecting in the semiconductor distributed directional negative resistances with respect to high frequency electric currents. The negative resistances have an active direction opposite to the direction of the DC electric field. Electrostatic shielding is provided between the input and output means is provided in the microwave region. The input microwave travels through the semiconductor from one end portion to the other and is amplified by the distributed directional negative resistances so that an amplified microwave is derived from the output means as the output microwave.

This invention relates to a microwave semiconductor device capable of amplifying input microwaves and more particularly to an amplifier using the negative resistance of a semiconductor.

There have been heretofore proposed microwave semiconductor devices of this type. In the conventional devices of this type, however, a DC field more than a critical value is applied across semiconductor wafers, so that the negative resistance is obtained in the direction of the thickness. Moreover, the semiconductor wafers are positioned in a wave guide so that the negative resistance is arranged in parallel with the E-plane of the electric field produced by microwaves to be amplified. In such formation or construction, the input microwaves applied from both directions perpendicular to that of the DC field are simultaneously amplified. In other words, the conventional device of this type is a bilateral amplifier in which oscillation is liable to occur. Accordingly, if a unidirectional amplifier is desirable, another directional means, such as circulator, has to be employed.

An object of this invention is to provide a microwave semiconductor device capable of stably amplifying input microwaves in an active unidirection.

Another object of this invention is to provide a microwave semiconductor device of small size operable as a unidirectional amplifier in the wide frequency band of microwave.

Further object of this invention is to provide a microwave semiconductor device of small size operable as a unidirectional amplifier in a selected frequency band of microwave.

Said objects and other objects of this invention can be attained by a microwave semiconductor device for amplifying at least one input microwave, comprising a semiconductor plate having the length considerably longer than the input microwave wave-length in the semiconductor plate and capable of realizing a condition in which the effective drift velocity of electrons in the conduction bands decreases as a DC electric field applied thereto is increased when the DC electric field exceeds a critical value, input means coupled to one end portion of the semiconductor plate to apply thereto the input microwave, output means coupled to the other end portion of the semiconductor plate to derive therefrom at least one output microwave, excitation means for applying the DC field to the semiconductor in excess of the critical value and in the longitudinal direction from the other end to the one end thereby realizing, in the semiconductor, distributed directional negative resistances with respect to high frequency AC current, the active direction of the distributed directional negative resistances being reverse to the direction of the DC electric field, and shielded means for shielding between the input means and the output means to each other in the microwave region, whereby the input microwave is travelled along the semiconductor plate from the one end portion to the other end portion and amplified by the distributed directional negative resistances so that the microwave amplified is applied to the output means as the output microwave.

The novel features of this invention are set forth with particularity in the appended claims, however this invention, as to its construction and operation together with other objects and advantages thereof, may best be understood by reference to the following description, taken in connection with the accompanying drawings, in which the same parts are designated by the same characters, numerals and symbols as to one another, and in which:

Figure 1:
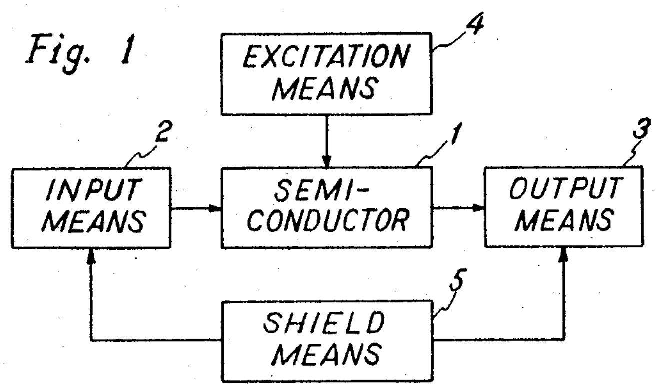
FIGURES 1, 2, 3 and 4 are respectively block diagrams for describing embodiments of this invention.

Referring to FIGURE 1, the principle of the semiconductor device of this invention for amplifying at least one input microwave will now be described. The device of this invention comprises a semiconductor 1, input means 2, output means 3, excitation means 4 and shield means 5. The semiconductor 1 is a semiconductor plate, such as n-type GaAs or n-type InP, having a characteristic in which the effective drift velocity of electrons in the conduction bands decreases as a DC field applied to the semiconductor 1 is increased when the DC field exceeds a critical value which is approximately 3000 volts/centimeter. The semiconductor plate 1 has a length considerably longer than the input-microwave wavelength in the semiconductor 1. In such semiconductor 1, the effective drift velocity of electrons is approximately one-three thousandth of the velocity of light. Accordingly, the wave-length of the input microwave in the semiconductor is approximately equal to 100$\mu$ in case of the frequency 1 gc. The input means 2 is coupled to one end portion of the semiconductor plate 1 and employed for applying the input microwave to the semiconductor 1. The output means 3 is coupled to the other end portion of the semiconductor plate 1 and employed for deriving, from the semiconductor 1, at least one microwave which is an output amplified according to the amplification principle as will be described hereinafter. The excitation means 4 applies the DC field to the semiconductor 1 in excess of the critical value and in the longitudinal direction from the other end to the one end. The shield means 5 is employed for shielding the input means 2 and the output means 3 from each other in the microwave region.

In said formation, the semiconductor 1 has a propagation constant $\Gamma_1$ in the same direction as that of the DC electric field and a propagation constant $\Gamma_2$ in the direction reverse to the direction of the DC electric field as follows:

$$\Gamma_1 = \frac{-eE_o}{kT} - j\frac{\omega}{v_o} \quad (1)$$

$$\Gamma_2 \doteq \frac{E_o}{v_o} \cdot \frac{\alpha v_o}{\alpha E_o} \frac{\sigma_o}{e v_o} + j\frac{\omega}{v_o} \quad (2)$$

where, $v_o$: the effective drift velocity of electron in the semiconductor;
$\sigma_o$: the electric conductivity of the semiconductor;
$E_o$: the intensity of the DC electric field;
$e$: the electric charge of electron;
$k$: Bolzmann constant;
T: the effective electron temperature;
$\omega$: the angular frequency of a signal travelling in the semiconductor; and
$j$: $\sqrt{-1}$ Accordingly, waves travelling in the direction of the DC field are gradually attenuated in the semiconductor 1 and become decreasing waves. On the contrary, waves travelling in the direction reverse to the direction of the DC field are gradually amplified in the semiconductor 1 according to its travel and become increasing waves.

As the result of said principle, distributed directional negative resistances are realized in the semiconductor 1 with respect to high frequency AC currents (inclusive of the microwave frequency region). The active direction of the distributed directional negative resistances is reverse to the direction of the DC electric field as described above. Accordingly, if an input microwave or microwaves is/are applied to the semiconductor 1 through the input means 2, the microwave or microwaves travels or travel along the semiconductor 1 from the end portion to which the input means 2 is coupled to the other end portion to which the output means 3 is coupled and is/are amplified in the semiconductor 1 by the distributed negative resistances. The microwave or microwaves is/are derived, through the output means 3, from the semiconductor 1. Since the input means 2 and the output means 3 are shielded from each other by the shield means 5 mentioned above, the amplification operation in the device can be carried out stably without risk of oscillation. By enlarging the length of the semiconductor plate 1 to be considerably, e.g. above several times, longer than the input-microwave wave-length, the amplification gain of the device can be increased.

An actual example of the device shown in FIGURE 1 will be described below, however, constitutional principles of other embodiments of this invention will first be described.

Figure 2:
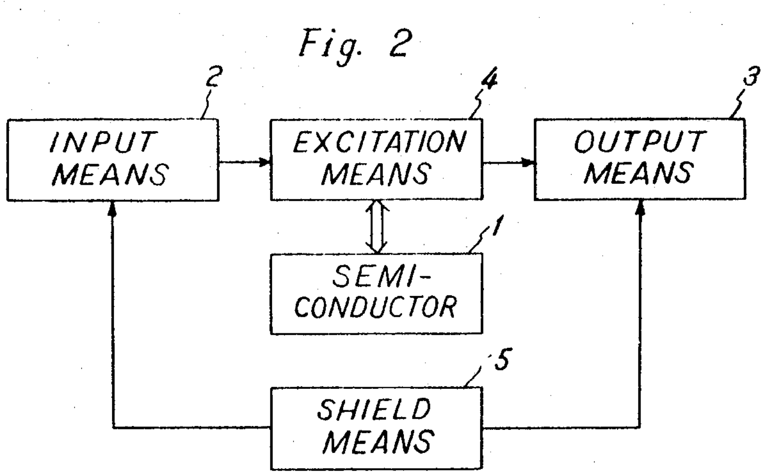

Coupling between the semiconductor 1 and the input means 2 or the output means 3 is not limited to the formation as is shown in FIGURE 1 but can be formed as is shown in FIGURE 2. In this case, the input means 2 and the output means 3 are coupled to the semiconductor 1 through the excitation means.

Figure 3:
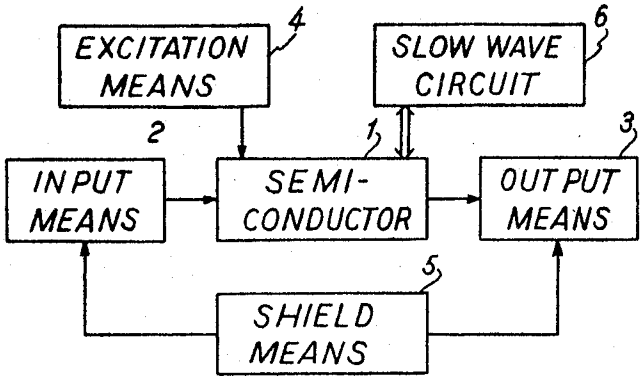
Figure 4:
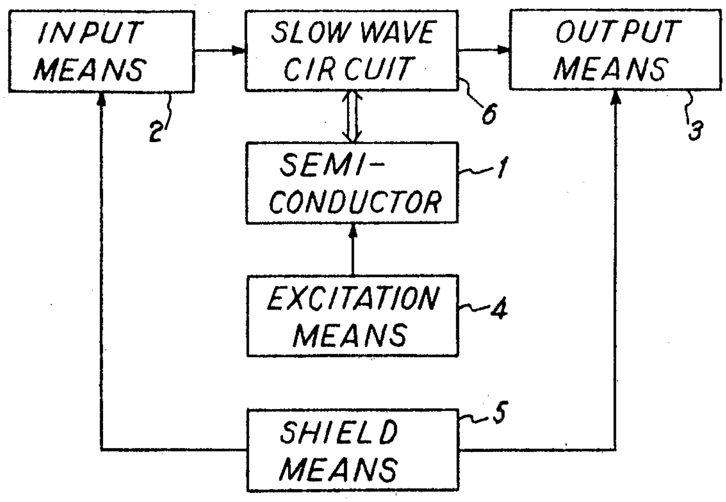

The device of this invention can be further provided with a slow-wave circuit 6 to raise the amplification gain as is shown in FIGURE 3. The slow-wave circuit 6 is coupled to the microwave travelling along the semiconductor 1. In the slow-wave circuit 6 the microwave travels at a travelling speed substantially equal to that of the microwave in the semiconductor 1 in the travelling direction of the microwave. As the slow-wave circuit 6, any of types such as ladder-type, comb-type or helix type can be employed. By the use of the slow-wave circuit, the amplification gain is increased since the microwaves travelled in the semiconductor 1 and the slow-wave circuit 6 interact with each other. Moreover, since the slow-wave circuit 6 is operable in a wide frequency band, the device with the slow-wave circuit 6 is also operable in a wide frequency band. The input means 2 and the output means 3 can be coupled to the semiconductor 1 through the slow-wave circuit 6 as shown in FIGURE 4. Since the effective drift velocity of electrons is approximately one-three thousandth of the velocity of light, the slow-wave circuit can be formed so as to be operable in the microwave region. If necessary, the slow-wave circuit 6 can be designed so that spatial harmonic electric fields produced from the slow-wave circuit 6 are coupled to the increasing microwave travelling along the semiconductor 1.

Figure 5:
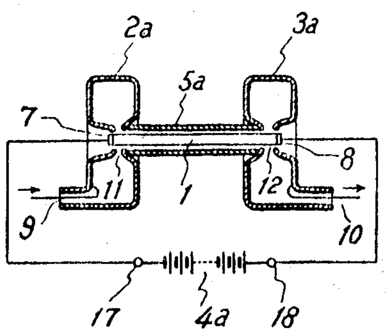
FIGURE 5 is a sectional view for illustrating an embodiment of this invention.

Referring to FIGURE 5, an actual example of the device of this invention corresponding to the block diagram shown in FIGURE 1 will now be described. In this embodiment, the semiconductor plate is formed with appropriate dimensions, e.g. a rectangular plate with a thickness 50$\mu$, a width of 1 millimeter and a length 2 millimeters, The input means 2 is composed of a doughnut-shaped cavity **2*a* and the output means 3 is composed of a doughnut-shaped cavity 3*a*. The cavities 2*a* and 3*a* have respectively narrow gaps 11 and 12 and an inlet 9 and an outlet 10 as are shown. From the inlet 9, at least one input microwave to be amplified is applied to the cavity 2*a*. Each of the cavities 2*a* and 3*a* is resonated with the frequency of the input microwave. A DC electric source 4*a* is connected to the semiconductor plate 1 through electrodes 7 and 8 each of which is connected to the semiconductor 1 through an ohmic contact. In this formation, the energy of the input microwave is applied to the semiconductor through the narrow gap 11. The input microwave is amplified in the semiconductor according to said principle and derived from the outlet 10 through the narrow gap 12 of the cavity 3*a*. To raise the efficiency of coupling between the semiconductor 1 and the cavity 2*a* (or 3*a*), it is desirable to make the dimension of the gap 11 (or 12) less than the wave length of the microwave in the semiconductor 1. Shield means 5 of this embodiment is a cylinder 5a both ends of which are respectively contacted with surfaces of the cavities 2a and 3a**.

Figure 6A:
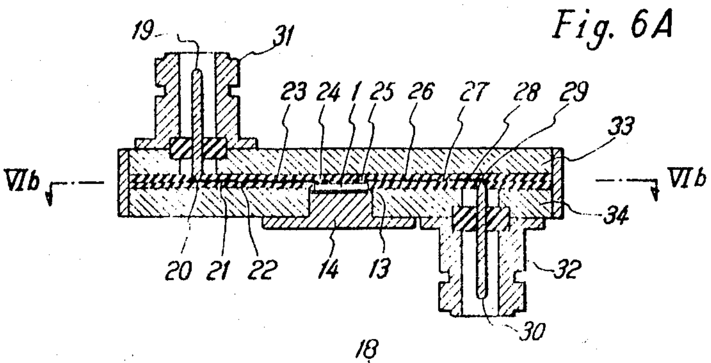
FIGURE 6A is an elevation view including partial sections for illustrating an embodiment of this invention.
Figures 6B, 6C:
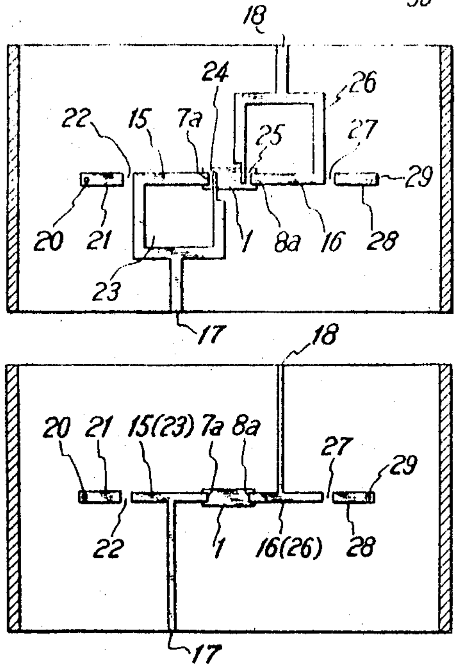
FIGURES 6B and 6C are plan views along a line VI*b*—VI*b* of the embodiment shown in FIGURE 6A.

Referring to FIGURES 6A and 6B, two examples of the device of this invention corresponding to the block diagram shown in FIGURE 2 will be described. In these embodiments, the semiconductor plate 1 is supported on a metal substratum 14 with an insulation layer 13. At both ends of the semiconductor 1, electrodes 7a and 8a are provided to form ohmic contacts between microwave strip lines 15 and 16 and both ends of the semiconductor 1 respectively. The DC electric source 4a is connected to terminals 17 and 18 to apply the DC electric field to the semiconductor 1 through the electrodes 7a and 8a. The input microwave is applied to an inner conductor 19 of a coaxial line connector which is connected to a microwave strip line 21 at a terminal 20. Accordingly, the input microwave applied to the microwave strip line 21 is applied to a resonator 23 through a capacitive coupling portion 22. The resonator 23 is designed so as to resonate with the frequency of the input microwave. Accordingly, a high electric field of the input microwave is produced at a gap 24 of the resonator 23 and applied to the semiconductor 1. With reference to the size of the gap 24 or 25, it is desirable for it to be less than the microwave wave-length in the semiconductor 1 as in the case of the gap 11 or 12. The input microwave amplified according to this amplification principle is derived through a gap 25 of a resonator 26 which is resonated with the frequency of the input microwave, and then derived from an inner conductor 30 of a coaxial line connector through a capacitive coupling portion 27, a microwave strip line 28 and a terminal 29. References 31 and 32 show respectively outer cylinders of the electrical connector for said inner conductors 19 and 30. Base metal plates 33 and 34 of the microwave strip line are employed as the shield means 5. The amplifying frequency characteristic of this embodiment can be changed in accordance with the change of said resonation frequency and/or the change of Q of the resonators 23 and 26.

The microwave strip line circuit shown in FIG. 6B can be substituted by a microwave strip line circuit shown in FIGURE 6C. In this case, the microwave strip lines 15 and 16 are simultaneously employed as the resonators 23 and 26 and, by electric field produced from edges of the microwave strip line 15 and 16, are effectively coupled to end portions of the semiconductor 1 near the terminals 7a and 8a.

Figure 7A:
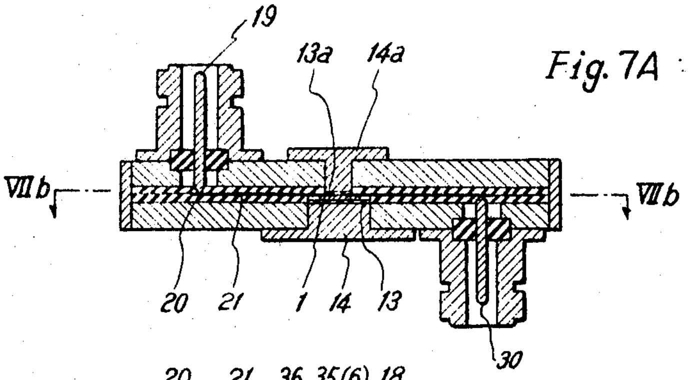
FIGURE 7A is an elevation view including partial sections for illustrating another embodiment of this invention.
Figure 7B:
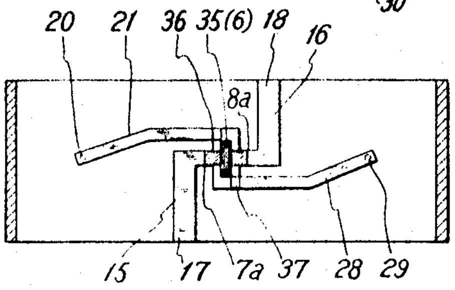
FIGURE 7B is a plan view along a line VII*b*—VII*b* in FIGURE 7A.
Figure 7C:
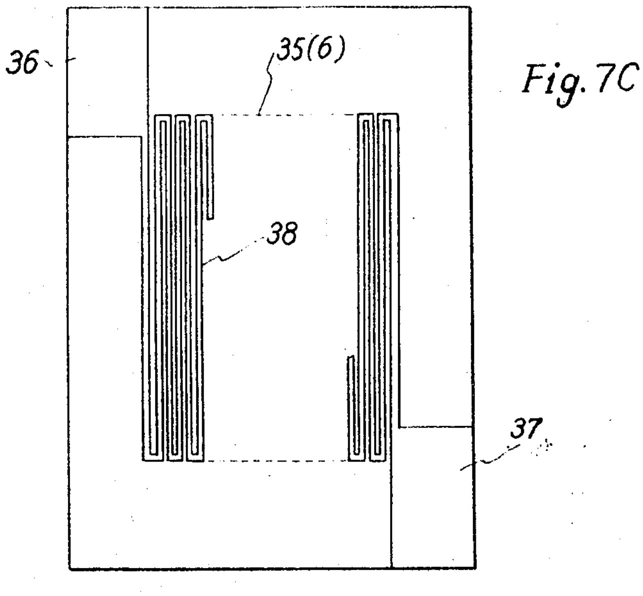
FIGURE 7C is an enlarged plan view for illustrating a slow-wave circuit used in the embodiment of this invention shown in FIGURE 7B.

Referring to FIGURES 7A, 7B and 7C, an actual example of the device of this invention corresponding to the block diagram shown in FIGURE 4 will now be described. In this embodiment, there is provided a slow-wave circuit 35 the terminals 36 and 37 of which are respectively connected to the microwave strip lines 21 and 28. Accordingly, the input microwave applied from the coaxial line 19 is coupled to the semiconductor 1 through the slow-wave circuit 35 which is formed by a meander line or path 38 as shown in FIGURE 7C in enlarged dimensions. The slow-wave circuit 35 of this type can be formed by photo-etching techniques.

Figure 8A:
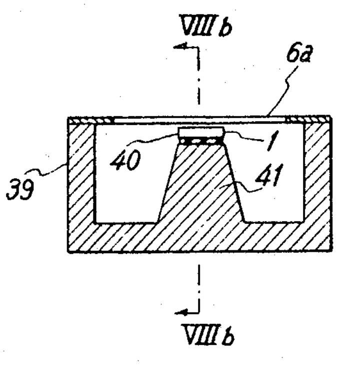
FIGURE 8A is a sectional view along a line VIII*a*—VIII*a* in FIGURE 8B for illustrating another embodiment of this invention.
Figure 8B:
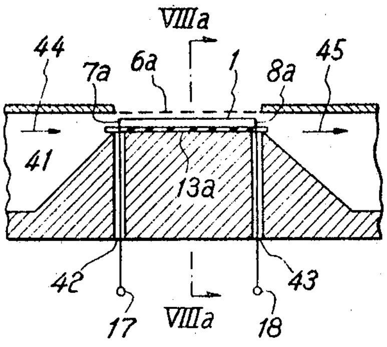
FIGURE 8B is a sectional view along a line VIII*b*—VIII*b* in FIGURE 8A.

Referring to FIGURES 8A and 8B, an actual example of the device of this invention corresponding to the block diagram shown in FIGURE 3 will now be described. In this embodiment, the shield means is composed of a rectangular wave guide 39 having in its inner space a narrow gap 40 which is substantially parallel with the H-plane of the microwave in the wave guide 39. The semiconductor 1 is supported in the narrow gap 40 by use of an insulation layer 13a which is thermally contacted to the wall of the wave guide 39 through a ridge 41 having a trapezoidal cross section. In the ridge 41, there are provided two holes 42 and 43 through each of which a connection line between the terminal 17 or 18 and the electrode 7a or 8a is passed. A slow-wave circuit 6a is arranged in the H-plane of the wave guide above the semiconductor 1 and insulated from it. The input microwave is applied to the semiconductor 1 from the direction shown by an arrow 44 and the microwave amplified is derived from the semiconductor 1 to the direction shown by an arrow 45.

Figure 9B:
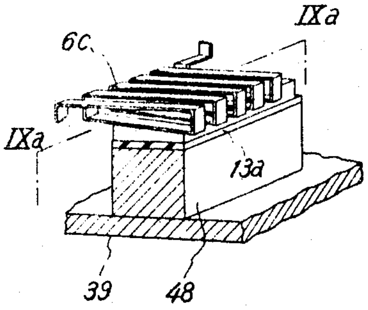
FIGURE 9B is a perspective view of a part of the embodiment illustrated in FIGURE 9A, the view including a section along a line IX*b*—IX*b* in FIGURE 9A.
Figure 9A:
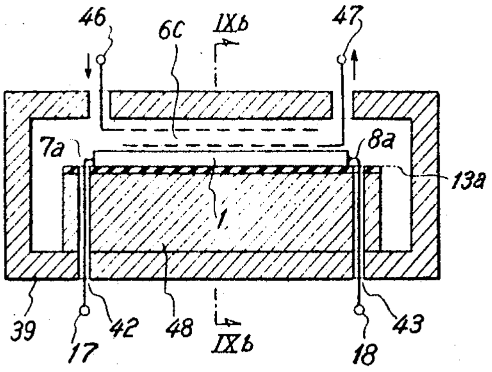
FIGURE 9A is a sectional view illustrating another embodiment of this invention along a plane IX*a*—IX*a* in FIGURE 9B.

FIGURES 9A and 9B show another example of the device of this invention corresponding to the block diagram illustrated in FIGURE 4. In this invention, there is provided a slow-wave circuit 6c to the terminal 46 of which the input microwave is applied and from the terminal 47 of which the microwave amplified is derived. The slow-wave circuit 6c of this embodiment is formed into a helical formation having a rectangular section.

Since it is obvious that many changes and modifications can be made without departing from the nature and spirit of this invention, it is to be understood that the invention is not to be limited to the details described herein except as set forth in the appended claims.

What we claim is:

1. A microwave semiconductor device for amplifying at least one input microwave, comprising an n-type semiconductor plate having a length considerably longer than the wave length of an input microwave applied to the semiconductor plate and capable of realizing a condition in which the effective drift velocity of electrons in conduction bands thereof decreases as a DC electric field applied thereto is increased to exceed a critical value, input means coupled to one end portion of the semiconductor plate to apply thereto said input microwave, output means coupled to another end portion of the length of the semiconductor plate to derive therefrom at least one output microwave, excitation means comprising a DC source including ohmic contacts for applying said DC field to the semiconductor in excess of the critical value and along the longitudinal direction thereof extending from the other end portion to the one end portion thereby effecting in the semiconductor plate, distributed directional negative resistances with respect to high frequency electric currents, the active direction of the distributed directional negative resistances being opposite to the direction of the DC electric field, and shielding means for electrostatic shielding of the input means and the output means from each other in the microwave region, whereby the input microwave travels through the semiconductor plate from the one end portion to the other end portion and is amplified by the distributed directional negative resistances so that the amplified microwave is derived from the output means as the output microwave.

2. A microwave semiconductor device according to claim 1, in which each of the input means and the output means is composed of means defining a cavity resonating with the frequency of the input microwave and having a narrow gap coupled to the end portion of the semiconductor plate.

3. A microwave semiconductor device according to claim 1, in which each of said input means and output means comprises a microwave strip line.

4. A microwave semiconductor device according to claim 3, in which said microwave strip line is provided with a rectangular loop circuit.

5. A microwave semiconductor device according to claim 1, in which the system is further provided with a slow-wave circuit which is coupled to the microwave travelled along the semiconductor plate and in which the input microwave travels at a travelling speed substantially equal to that in the semiconductor plate in the travelling direction of the microwave.

6. A microwave semiconductor device according to claim 5, in which each of the input means and the output means is composed of a cavity resonating with the frequency of the input microwave and having a narrow gap which is coupled to the respective end portions of the semiconductor plate.

7. A microwave semiconductor device according to claim 5, in which the input means and the output means are respectively coupled to the respective end portions of the semiconductor through the slow-wave circuit.

8. A microwave semiconductor device according to claim 1, in which the shield means is composed of a rectangular wave guide having a narrow gap which are substantially parallel with H-plane of the wave guide, the semiconductor plate being supported in the narrow gap by use of an insulation layer which is thermally contacted to the wall of the wave guide.

References Cited

UNITED STATES PATENTS

| | | | |
|---|---|---|---|
| 2,760,013 | 8/1956 | Peter | 330—5 |
| 3,200,354 | 8/1965 | White | 330—5.5 |
| 3,270,241 | 8/1966 | Vural | 330—5 |

ROY LAKE, Primary Examiner

D. R. HOSTETTER, Assistant Examiner

U.S. Cl. X.R.

330—56